UNITED STATES PATENT OFFICE.

JOHN T. DAVIS, OF SAN FRANCISCO, CALIFORNIA, ASSIGNOR OF ONE-HALF TO CHARLES W. KOHLSAAT, OF NEW YORK, N. Y.

ARTIFICIAL FUEL.

SPECIFICATION forming part of Letters Patent No. 595,672, dated December 14, 1897.

Application filed May 6, 1897. Serial No. 635,423. (No specimens.)

*To all whom it may concern:*

Be it known that I, JOHN T. DAVIS, a citizen of the United States, residing at San Francisco, in the county of San Francisco and State of California, have invented certain new and useful Improvements in Artificial Fuel; and I do hereby declare the following to be a full, clear, and exact description of the invention, such as will enable others skilled in the art to which it appertains to make and use the same.

This invention relates to artificial fuel.

The object is to produce an artificial fuel which shall burn practically without smoke— that is to say, in which all free carbon shall be combined with oxygen and in which carbon monoxid, a product of combustion, shall be oxidized to carbon dioxid—that is to say, in which and from which there shall be complete combustion with utilization of all the heat units, giving an increased calorific effect—the said fuel to be impervious to water and to hold together firmly until completely consumed and for purposes of transportation.

In carrying my invention into effect I take, by weight, one hundred parts of coal-dust, eight parts of lime, partially slaked by a solution of sulfate of iron, and eight parts of saccharine matter—such as refuse molasses, the refuse of beet-sugar factories, or other suitable like material—the mass being incorporated or mixed together in a suitable apparatus heated to a temperature of 120° Fahrenheit, more or less, after which the mixture is taken and immediately compressed into pieces or blocks of any desired form or size.

The lime is prepared in the following manner: Freshly-burnt lime is partially slaked with a hot solution of sulfate of iron, the iron sulfate to be in the proportion of one pound to a gallon of water. The lime is placed in a revolving screen, and the hot solution of sulfate of iron and water is sprinkled over it while it is in motion, so that as fast as it is slaked the fine particles drop away from the mass, leaving the unslaked portion to be dampened with the hot solution. Just enough of the solution is used to reduce the lime to a fine powder, and in this form it is used to mix with the coal-dust. This operation reduces the lime to a semihydrated condition, so that when the saccharine matter is introduced into the lime-and-coal mixture the water in the saccharine matter is taken up by the lime and effects its perfect hydration, forming a compound impervious to water without destroying the binding quality of the saccharine matter. In addition to rendering the briquet impervious to water the mixture of lime and sulfate of iron causes the briquet to harden under water, so that it will be unnecessary to store the finished product under sheds, as is usual, to prevent disintegration.

Having thus described my invention, what I claim as new, and desire to secure by Letters Patent of the United States, is—

1. A composition of matter for artificial fuel, composed of divided coal, saccharine matter, and lime partially slaked by a solution of sulfate of iron, substantially as described.

2. A composition of matter for artificial fuel, composed of divided coal, saccharine matter, and lime partially slaked by a hot solution of sulfate of iron, substantially as described.

3. The herein-described process of making an artificial fuel which consists in mixing together coal, saccharine matter, and lime partially slaked by a hot solution of sulfate of iron, and completing the slaking of the lime by the moisture in the saccharine matter, substantially as described.

4. A composition of matter for artificial fuel, composed of the following elements by weight: one hundred parts of coal-dust, eight parts of lime partially slaked by a hot solution of sulfate of iron, and eight parts of saccharine matter, substantially as described.

In testimony whereof I affix signature in presence of two witnesses.

JOHN T. DAVIS.

Witnesses:
S. B. MCCONNICO,
THEOPHILUS N. MARO.